United States Patent
Halavi et al.

(10) Patent No.: US 8,576,120 B2
(45) Date of Patent: Nov. 5, 2013

(54) SATELLITE TRACKING METHOD AND APPARATUS THEREOF

(75) Inventors: Moshe Halavi, Shoham (IL); Hagay Peled, Hod Hosharon (IL); Adi Berger, Petah-Tikva (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 296 days.

(21) Appl. No.: 13/181,039

(22) Filed: Jul. 12, 2011

(65) Prior Publication Data

US 2012/0013506 A1    Jan. 19, 2012

Related U.S. Application Data (60) Provisional application No. 61/363,869, filed on Jul. 13, 2010.

(51) Int. Cl.
  *H01Q 3/00*    (2006.01)
(52) U.S. Cl.
  USPC .......................................................... 342/359
(58) Field of Classification Search
  USPC .......................................................... 342/359
  See application file for complete search history.

(56) References Cited

U.S. PATENT DOCUMENTS 5,077,561 A * 12/1991 Gorton et al. ................. 342/359
5,592,176 A    1/1997 Vickers et al.

FOREIGN PATENT DOCUMENTS

FR    2918827    1/2009

OTHER PUBLICATIONS

EP Search Report, issued in EP 11173666.6, maildate Sep. 8, 2011.
Holleboom K G, "Self-Learning Step Track System to Point an Antenna at a Geostationary Satellite Using a PC" IEEE Transactions on Consumer Electronics, IEEE Service Center, New York, NY US, vol. 52, No. 3, Aug. 1, 1987, pp. 481-487, XP011158609, ISSN: 0098-3063.
Khan K S, "Tracing Techniques for Inclined Orbit Satellites", Sep. 30-Oct. 3, 1990, pp. 364-368 XP010002803.

* cited by examiner

*Primary Examiner* — Harry Liu
(74) *Attorney, Agent, or Firm* — Banner & Witcoff, Ltd.

(57) ABSTRACT

A satellite communication ground station configured for communicating over an inclined orbit geostationary satellite may include a tracking antenna having three fixed axis and one moving axis, a motor for swinging the antenna along the moving axis, a controller for controlling the motor, a receiver configured to receive a signal arriving from the satellite via the tracking antenna and an estimator configured to estimate reception quality of a signal received by the receiver. The invention described herein presents a method for tracking an inclined orbit geostationary satellite, the method comprising a learning step and a tracking step, wherein the learning step includes use of a filter for reducing alignment errors and reducing the amount of peaking required for aligning the antenna with the satellite and tracking its movement.

27 Claims, 4 Drawing Sheets

SATELLITE TRACKING METHOD AND APPARATUS THEREOF

RELATED APPLICATIONS

The present application is a non-provisional of U.S. Patent Application No. 61/363,869, entitled "Satellite Tracking Method and Apparatus Thereof," filed Jul. 13, 2010, the contents of which are incorporated herein by reference in their entirety for all purposes.

FIELD OF THE INVENTION

This invention pertains to the field of satellite communication systems. In particular, this invention pertains to methods and systems for tracking inclined orbit satellites.

BACKGROUND

Systems for communication via satellites are well known in the art and have been used in many applications for several decades. Many of these systems use geostationary satellites, i.e. satellites seen at fixed positions in the sky relative to the earth due to being located at the Clark Belt (i.e. approximately 36,000 kilometers above the earth's equator, where the angular velocity of the satellite matches the angular velocity of the earth rotation around its axis). As these satellites seem stationary, ground stations in some of these communication systems (for example VSAT systems, television broadcasting systems, etc.) may employ relatively simple and inexpensive antennas (e.g. ones not including moving parts and/or motors). This economical aspect allows wide usage of such communication systems for many applications.

However, geostationary satellites are actually not stationary at all but rather very much in motion. While most of this motion is synchronized with the earth rotation, some of it causes the satellite to deviate from its nominal position above the earth's equator. In order to keep a geostationary satellite in place, i.e. within a small distance from its nominal position (a distance which does not affect the performance of communication systems and/or which allows use of antennas lacking any tracking mechanisms (non-tracking antennas)), the satellite course must be periodically corrected. Thus, geostationary satellites have engines for performing course corrections.

Unfortunately, course-correction engines of geostationary satellites run on fuel (gas). Each geostationary satellite is launched with a certain amount of fuel, designed to suffice for making all the required course corrections over the predetermined operation duration of the satellite (usually around 15 years). However, since building and launching new geostationary satellites is very expensive (usually in the hundreds of millions of USD per satellite), operators of geostationary satellites try to prolong the use of already deployed satellites before replacing them with new ones. Thus, as a geostationary satellite runs out of fuel (leaving little fuel for taking the satellite out of orbit when it is no longer usable), the satellite operator reduces the frequency of course corrections and ultimately stops making them altogether.

As a result of making less or no course corrections, geostationary satellites develop a cyclic inclination motion around the nominal position (relative to the earth). Thus, a satellite in such condition is often referred to as an inclined orbit satellite. The path the satellite makes in the sky, as a result from the cyclic inclination motion and as seen from the earth, resembles the figure "8". An inclined orbit satellite completes a full inclination cycle every 23 hours, 56 minutes and 4 seconds, during which it passes the center of the inclination path (i.e. the satellite's nominal position) twice. The magnitude of the satellite's inclination is measured in degrees (i.e. an angle, as seen from a location on earth looking at the satellite). With its course being uncorrected, the inclination of an inclined orbit satellite increases by approximately one (1) degree per year.

Figure 4:
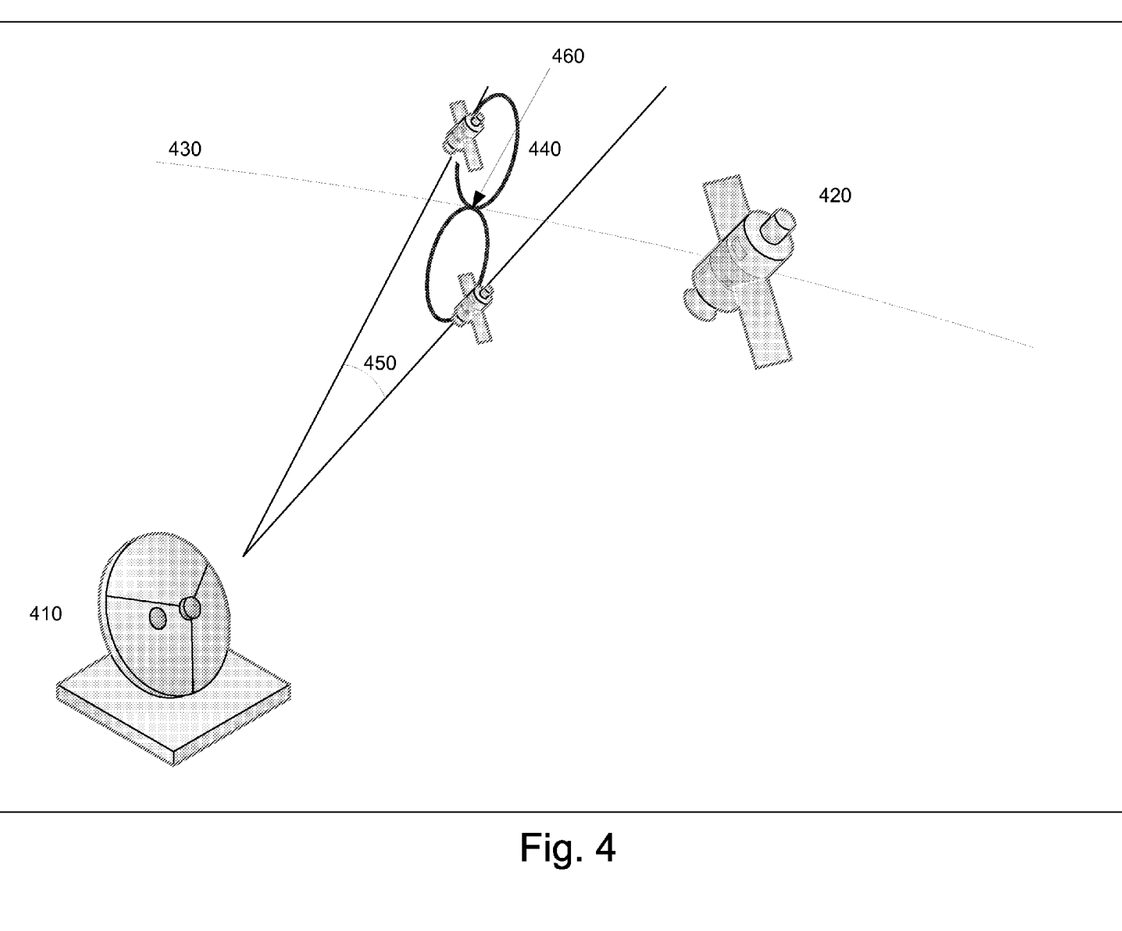
FIG. 4 shows an illustration of satellite inclination in accordance with aspects of the invention.

FIG. 4 shows an exemplary satellite communication system, comprising a ground station 410 and an inclined orbit satellite 420. Due to the inclination, satellite 420 may be seen from ground station 410 as moving around orbital arch 430 in accordance with inclination path 440, crossing orbital arch 430 at point 460 twice in each inclination cycle. As a result of the inclination, satellite 420 may be seen from ground station 410 as moving across inclination angle 450.

As previously described operators of geostationary satellites keep operating inclined orbit satellites as long as they can sell the capacity over these satellites (i.e. for use by communication systems) or until they manage to replace them by new ones. Using inclined orbit satellites requires using tracking antennas at the ground stations of communication systems. These antennas are usually more expansive than regular antennas that may be used with properly positioned geostationary satellites. However, some communication systems operators may opt to using the more expensive equipment since the satellite capacity is usually sold at lower prices (to balance the higher cost of equipment) and due to capacity shortage over properly positioned satellites.

It is well known in the art that tracking antennas may include one or more motors, for adjusting the antenna alignment along one or more axis, and at least one controller, which may control the motor(s). The controller may be configured to use methods for determining the satellite position and for keeping track of its position as it moves along the inclination path in order to insure continuous communication via the satellite between the ground station and any other ground station(s) comprising the communication system.

However, the existing methods used for tracking inclined orbit satellites have deficiencies. Most of these deficiencies are related to a process called peaking The peaking process may be used for determining the correct alignment of the antenna with the satellite (i.e. for pointing the center of the antenna beam at the satellite's position). In order to do so, the antenna must be moved off the center of the beam and/or around the expected position (i.e. the center position) while reception quality of a signal arriving from the satellite is measured at each of the attempted positions. Once reception level measurements covering the entire peaking scanning range are acquired, the measurements and information regarding antenna positions corresponding to those measurements may be processed to produce a calculated center position.

However, in order to achieve accurate alignment (i.e. pointing the exact center of the antenna beam towards the satellite with minimal alignment error), the antenna must be moved quite significantly away from the center position, causing perhaps significant deterioration in reception quality of received signals. On one hand, if the peaking process is done with a purpose to yield a highly accurate result and/or a minimal alignment error, the antenna must be moved over a relatively large range, hence the process may take considerable time to complete and during which service at the ground station is significantly affected (i.e. as moving further away from the center position further decreases at least the reception level). Moreover, during that time the satellite keeps moving, i.e. the longer it takes to complete the process the further the satellite may move and the larger the resulting alignment error may get after all. On the other hand, if the peaking process is shortened and the search is limited to a smaller range, the resulting antenna alignment is likely to be less than optimal and include a significant alignment error. This alignment error reduces overall performance of the ground station (as at least the reception quality is less than optimal) and increases the probability for needing to repeat the peaking process thereafter (hence further causing performance degradation as well as expediting wear processes of motors and moving parts, which results in higher maintenance costs).

Thus, a more efficient method for tracking inclined orbit satellites is needed.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

A satellite communication ground station configured for communicating over an inclined orbit geostationary satellite may include a tracking antenna having three fixed axis and one moving axis, a motor for swinging the antenna along the moving axis, a controller for controlling the motor, a receiver configured to receive a signal arriving from the satellite via the tracking antenna and an estimator configured to estimate reception quality of a signal received by the receiver.

In one aspect of the invention, the controller of the tracking antenna may be configured to use a method for tracking an inclined orbit geostationary satellite, the method comprising a learning step and a tracking step. During the learning step, the controller may be configured to create a table including information corresponding to the satellite's inclination path, by perform a peaking process at constant predetermined intervals over a period of a full inclination cycle, storing the peaking results and applying a filter to these results for at least the purpose of reducing alignment errors. During the tracking step, at constant intervals, the controller may be configured to calculate an antenna position using the filtered table and to command the motor for at least the purpose of moving the antenna to the calculated position.

In another aspect of the invention, during said tracking step, the controller may be configured to obtain reception quality estimation at a current antenna position, compare the currently obtained reception quality estimation with a reception quality estimation obtained during the learning step at a corresponding antenna position and stored in said table, and to determine whether the difference between the current estimation and the stored estimation exceeds a predefined threshold. The controller may be further configured, after determining that the threshold has been exceeded, to perform a peaking process for the current satellite position for at least the purpose of correcting the tracking table. In some additional embodiments of the invention, the controller may be yet further configured to resume the learning step and reacquire the entire table upon determining said exceeding for a predetermined number of consecutive comparisons.

In another aspect of the invention, an improved peaking process is presented. By combining a peaking process with said tracking method previously mentioned and in particularly with said filtering of the acquired table, the improved peaking process may be used for at least the purpose of minimizing the degradation in signal reception level during peaking and consequently minimizing the effect on the ground station's performance.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Figure 1:
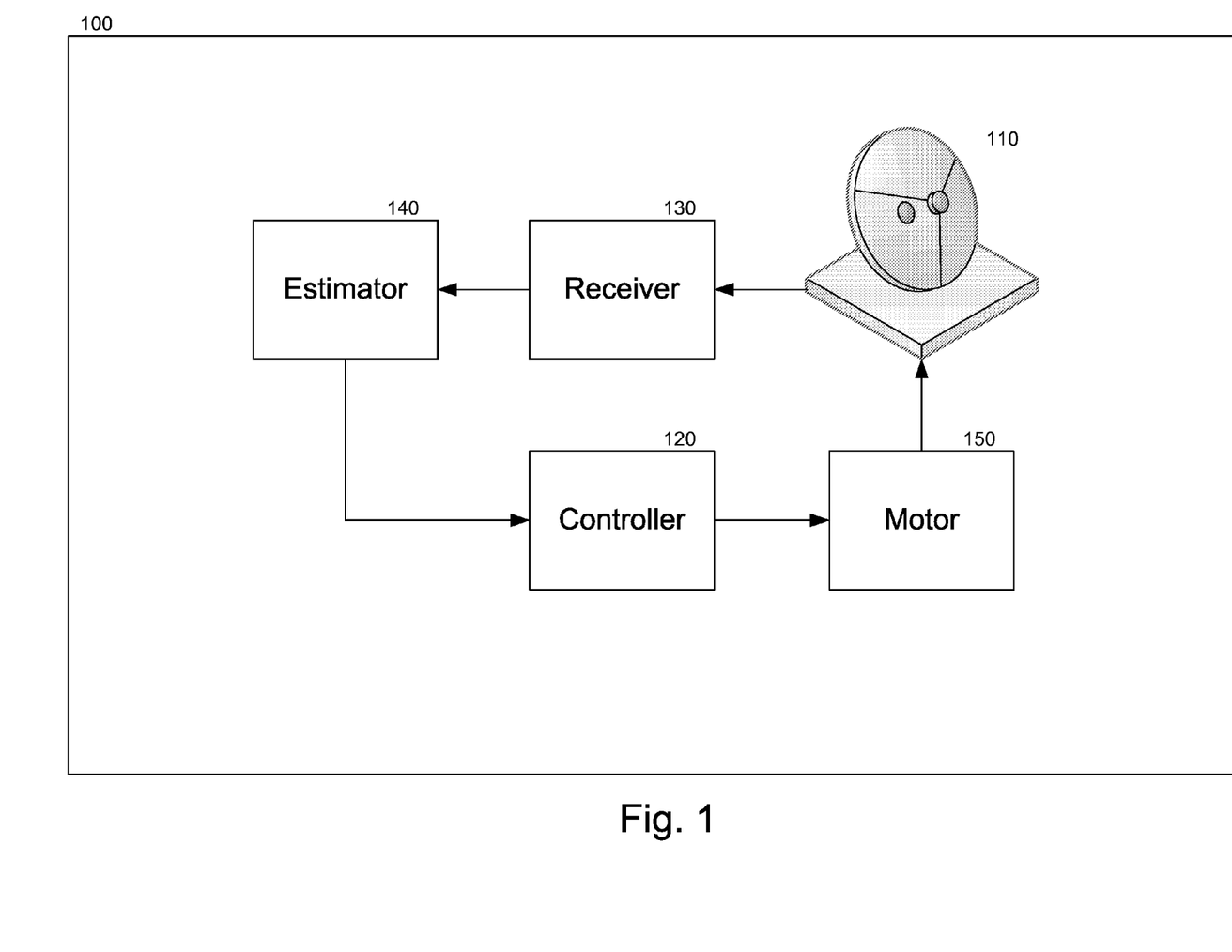
FIG. 1 shows a satellite communication ground station in accordance with aspects of the invention.

Referring to FIG. 1, a satellite communication ground station 100 may be configured for communicating over an inclined orbit geostationary satellite. Ground station 100 may include a tracking antenna 110 configured to have three (3) fixed axis (azimuth, mount elevation and polar) and one moving axis. Motion around the forth axis (inclination axis) may be controlled by a motor 150, wherein the motor operation may be further controlled by a controller 120. Ground station 100 may further include a receiver 130, which may be configured to at least receive a signal arriving from the satellite via tracking antenna 110, and an estimator 140, which may be configured to at least estimate reception quality of a signal received by receiver 130 and provide the estimation to controller 120.

When all three fixed axis of tracking antenna 110 are properly aligned, the center of the antenna beam may be pointed at the satellite's nominal position on the orbital arc, i.e. at the point where the inclination path crosses the orbital arc. By driving motor 150, tracking antenna 110 may be swung around the inclination axis for at least the purpose of tracking the satellite as it moves along the inclination path.

In one aspect of the invention, controller 120 of tracking antenna 110 may be configured to use a method for tracking an inclined orbit geostationary satellite, the method comprising a learning step and a tracking step.

During the learning step, controller 120 may be configured to create a map of the satellite's inclination path, as seen from where the antenna is located. In order to create this map, controller 120 may be configured to perform a peaking process at constant predetermined intervals over a period of a full inclination cycle. In some embodiments of the invention, the predetermined interval may be selected in such a way, that a whole number of such intervals may be exactly fitted into the inclination cycle duration. In other words, if t represents the interval between two consecutive performances of the peaking process and T represents the inclination cycle duration, then t may be selected so that T=N*t, wherein N is a natural number.

In each execution of the peaking process, controller 120 may be configured to command motor 150 to change the antenna position over the inclination axis in order to align the center of the antenna beam with the satellite. Once the peaking process is concluded and the antenna is properly positioned (i.e. the center of the antenna beam points at the satellite), controller 120 may be configured to record: (a) the state of motor 150 (e.g. an actuator motor position) corresponding to the antenna position (which in turns corresponds to the satellite's position on the inclination path); (b) a reception quality figure (e.g. a total power level) obtained from estimator 140 for a signal received from the satellite by receiver 130; and (c) a time stamp corresponding to the time of recording said information. In some embodiment, the reception quality figure may correspond to a signal comprising the entire or a large portion of the spectrum transmitted by the satellite, for at least the purpose of reducing the sensitivity of signal reception quality estimation to any one or more carriers that may or may not be present within the satellite's spectrum. In further embodiments, the recorded time stamp may be an index of a specific peaking interval within the inclination cycle. For example, if the peaking process is performed exactly N times within a complete inclination cycle duration T (as previously described), then the recorded timestamp may be a natural number between 1 and N.

As the satellite completes a full inclination cycle, controller 120 may be configured to conclude the learning step. As the learning step ends, controller 120 may have generated a tracking table. The tracking table may consist of records, which may have been generated at even intervals and wherein each record may include a value corresponding to a state of antenna motor 150, which in turn corresponds to a satellite's position, and a signal quality figure, both corresponding to a time stamp included in the record.

Figure 2:
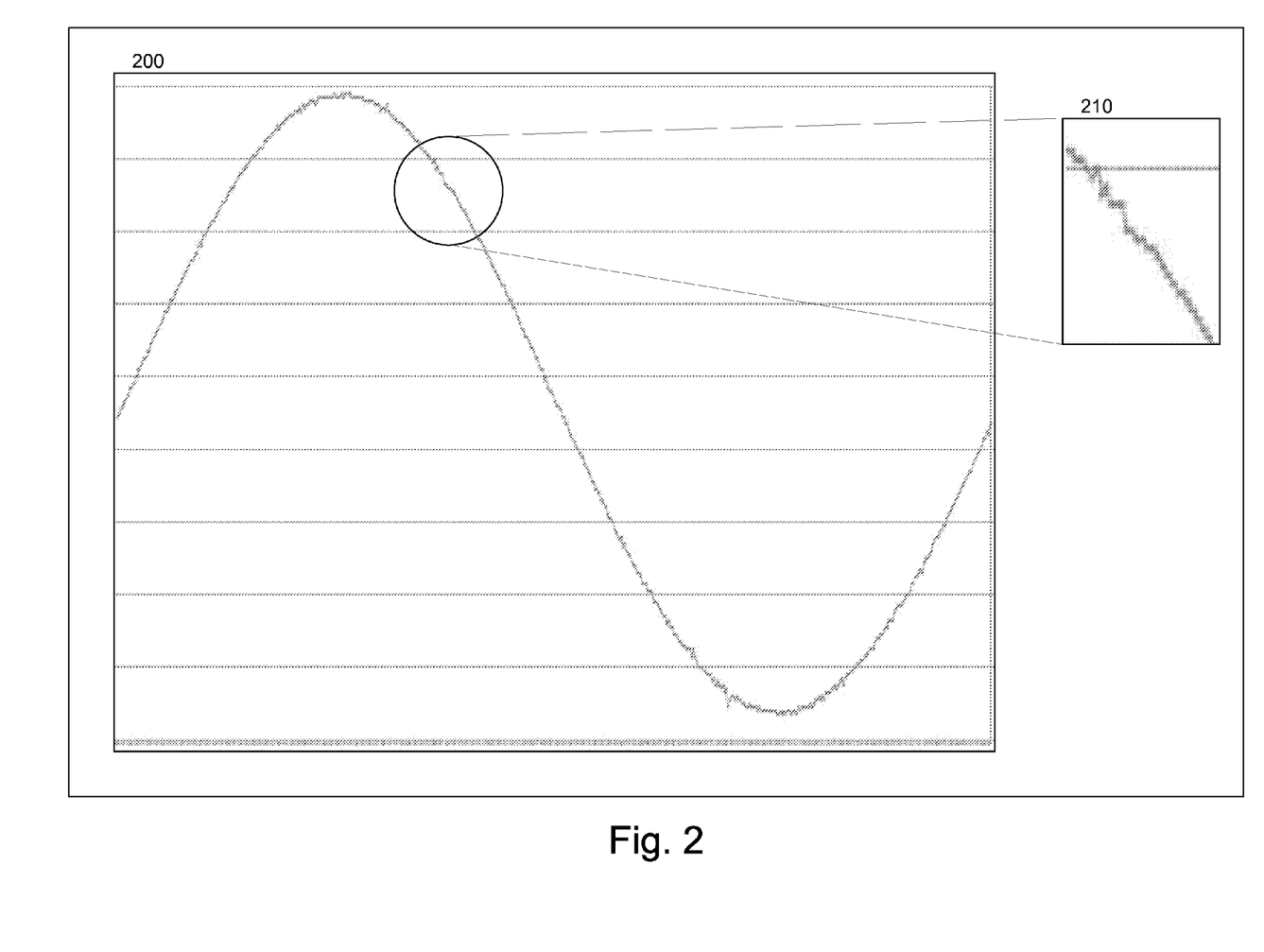
FIG. 2 shows a graph that may describe antenna motor state values in accordance with aspects of the invention.

FIG. 2 shows graph 200, that may be generated from antenna motor state values as may be stored in a tracking table at the end of a learning step. Graph 200 may depict the path of an inclined orbit satellite around its nominal position. For inclined orbit satellites, that path usually follows the general form of a sinus function graph.

However, as shown in FIG. 2, the graph may not be smooth. While it may follow the general form of a sinus function, when looking at a small section at a time, e.g. section 210, one may observe deviations and irregularities, which may represent alignment errors. These errors may originate from the peaking process, as it may be affected by many factors, including but not limited to the total range scanned (the shorter the range the less accurate the peaking result may be) and changes in weather conditions during peaking which may affect signal level estimation (such as wind gusts which may slightly tilt the antenna during peaking, changes in rain intensity, etc).

In order to remove alignment errors, that may be introduced into the tracking table during the learning step (i.e. by the peaking process), as well as possibly other irregularities (e.g. one or more measurements may be missing from the table, e.g. due to power failures during the learning step), for at least the purpose of using the tracking table for tracking the satellite (i.e. predicting the satellite's location at any given time and positioning the antenna accordingly), controller 120 may be configured to apply a filter to the series of antenna motor state values included in the tracking table and replace said values recorded during the learning step with corresponding values resulting from said filter application. Application of a filter to the series of antenna motor position values listed in the tracking table may be possible due to having these values "sampled" at fixed intervals. In some embodiments, wherein controller 120 includes a processor, said filter may be applied to the series of antenna motor state values using well known digital signal processing methods. By using such filtering, the alignment errors, which may be regarded as "high-frequency noise" may be eliminated from the processed "signal", leaving only the "base harmonic", i.e. a smooth description of the satellite's path (which is of course smooth since the satellite motion is smooth) and the antenna motor state values needed for tracking that path. In some further embodiments of the invention, said filter may be a low pass filter with a cut-off frequency approximately ten (10) times higher from the frequency represented by the "base harmonic". For example, if the inclination cycle frequency may be considered as "1 Hz", then the cut-off frequency of the filter may be considered as "10 Hz".

Figure 3:
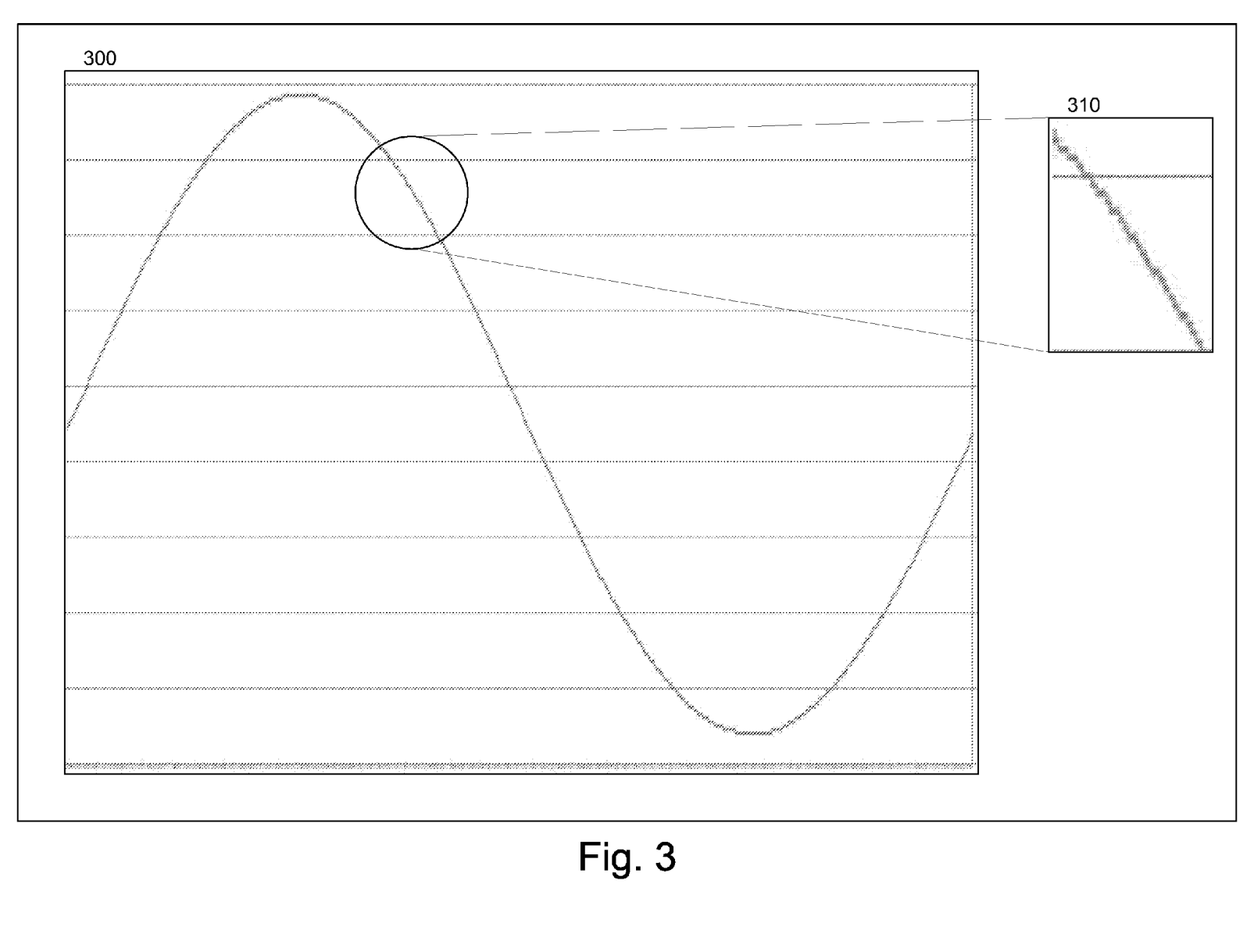
FIG. 3 shows a graph that may describe antenna motor state values after filter application in accordance with aspects of the invention.

FIG. 3 shows graph 300, that may be generated from antenna motor state values as may be stored in a tracking table after application of a filter as described above. A comparison between graph 200 of FIG. 2 and the corresponding filtered graph 300 of FIG. 3 shows that the filter may have smoothen at least most of the irregularities. This smoothening may be observed even at close look over a small section at a time, e.g. section 210 of FIG. 2 and its corresponding section 310 of FIG. 3.

Once the tracking table is filtered as described above, the learning step is concluded and the tracking step starts. During the tracking step, controller 120 may be configured to calculate the antenna position every predetermined interval. In order to achieve optimal operation, the predetermined interval may be quite short (e.g. tens of seconds) so that the antenna position may be corrected before a significant degradation in performance occurs due to movement of the satellite. By knowing the current date and time and by having a (filtered) tracking table covering a complete inclination cycle of the satellite at known date and time, controller 120 may calculate the current position of the satellite within its inclination cycle and then find (e.g. in the filtered tracking table) or calculate (using the filtered tracking table) the appropriate antenna motor state value corresponding to the satellite position. Controller 120 may then command motor 150 with the appropriate motor state value for at least the purpose of moving the antenna to the calculated position.

In some embodiments of the invention, the intervals between antenna position calculations during the tracking step may be the same as the intervals between peaking process performances during the learning step. In such embodiments, the first interval of the tracking step may immediately follow the last interval of the learning step with the antenna being positioned using the first entry in the (filtered) tracking table. For at least the purpose of keeping such synchronization and/or assuring a smooth transition from the learning step to the tracking step, controller 120 may be configured to keep a time base (e.g. accurate date and time). Controller 120 may be further configured to keep the time base even when it is not properly powered (e.g. due to a power outage) by using time-keeping circuitry, possibly comprising a back-up battery.

In some embodiments of the invention, where the intervals between antenna position calculations during the tracking step may be the same as the intervals between peaking process performances during the learning step, the first interval of the tracking step may immediately follow the last interval of the learning step with the antenna being positioned using the first entry in the (filtered) tracking table, and where the recorded time stamps may be indexes of peaking intervals within the inclination cycle (as previously described), the tracking step may be easier and require less calculations. Controller 120 may be configured to keep a periodic timer (i.e. one which automatically rearms when the predetermined duration expires), with duration equal to the peaking interval timer, and an index pointer that points to the (filtered) tracking table. Whenever the timer expires (i.e. reloads), controller 120 may be configured to increase the index pointer by one unit in order to access the immediately following entry in the (filtered) tracking table and drive motor 150 with the motor state value recorded in that entry. Once the last entry is reached, upon the next expiry of the timer the index pointer may be reset to point to the first entry of the (filtered) tracking table, hence achieving a cyclic motion.

In addition, during the tracking step, controller 120 may be configured to monitor reception quality using reception quality estimations that may be obtained from estimator 140 for a signal received from the satellite by receiver 130. In some embodiments, reception quality monitoring may be performed at regular intervals, wherein these intervals may correspond to the predetermined interval used for repositioning the antenna, as previously described. At these intervals, after positioning the antenna at the calculated position, controller 120 may compare an estimation provided by estimator 140 at that time with the signal reception quality figure stored in the tracking table and corresponding to the current satellite position. In some embodiments of the invention, if the difference between the estimation provided by estimator 140 and the reception quality figure stored in the tracking table exceeds a predefined threshold, controller 120 may be configured to perform the peaking process for the current satellite position for at least the purpose of correcting the tracking table. However, since the tracking table is very accurate to begin with due to the application of a filter at the end of the learning step, as previously described, the number of occasions on which the peaking process has to be performed during the tracking step may be significantly lower than in existing tracking methods known in the art. Thus, as less peaking operations, during which the antenna is taken out of position, may be needed, signal degradation during tracking may be minimized.

Controller 120 may be configured to perform the peaking process as described above if the current estimation is lower than the corresponding reception quality figure stored in the tracking table by more than a predefined first threshold, and/or if the current estimation is higher than the corresponding reception quality figure stored in the tracking table by more than a predefined second threshold, wherein the first and second thresholds may be of the same magnitude or of different magnitudes. When the current estimation is higher than the corresponding reception quality figure stored in the tracking table by less than the predefined second threshold, controller 120 may be configured to adjust the reception quality figure in the relevant tracking table entry without performing the peaking process. For example, in some embodiments of the invention, controller 120 may be configured in that case to add to the reception quality figure stored in the tracking table half the difference between the stored value and the current estimation.

In yet some additional embodiments of the invention, controller 120 may be configured to resume the learning step and reacquire the entire tracking table upon determining that the differences between estimations provided by estimator 140 and the corresponding reception quality figures stored in the tracking table exceed a predefined threshold for a predetermined number of consecutive comparisons. In yet some further embodiments, controller 120 may be configured to resume the learning step and reacquire the entire tracking table only upon failing to correct the tracking table (i.e. entries for which current estimations exceed corresponding reception quality figures stored in the tracking table by more than a predefined threshold) as previously described, i.e. upon failing to successfully complete the peaking process for a predetermined number of consecutive attempts. Controller 120 may be so configured (i.e. to determine that the threshold is exceeded a predefined number of times consecutively or that the peaking process failed for a predefined number of times consecutively before resuming the learning step) for at least the purpose of preventing unnecessary resuming of the learning step due to momentary degradations in signal reception quality, which may be caused by reasons other than an antenna alignment error, for example intense rain, strong wind gusts that may momentarily tilt the antenna, etc. Thus the learning step may be resumed only when necessary, for example when a change in the satellite's inclination path (e.g. due to increasing inclination over time or due to a course correction by the satellite's operator) may result in constant degradation in the ground station performance.

In another aspect of the invention, an improved peaking process is presented. As previously described, the peaking process is a method for determining the correct alignment of an antenna with a satellite, i.e. for finding the center of the antenna beam and pointing it exactly at the satellite's position. In some embodiments of the invention, controller 120 of ground station 100 may be configured to perform the peaking process in accordance with the method presented herein. While the following description refers to controller 120, it should be appreciated by any person skilled in the art that the disclosed method may be performed independently of controller 120 as previously described.

Controller 120 may be configured upon starting the peaking process to record a value corresponding to a motor state (e.g. an actuator motor position), wherein the motor may be included in a ground station (e.g. motor 150 of ground station 100) for at least the purpose of moving an antenna along an inclination axis. Controller 120 may be further configured to also record a value corresponding to a reception quality figure, wherein the reception quality figure may be obtained from an estimator (e.g. estimator 140) for a signal received from a satellite by a receiver (e.g. receiver 130). In some embodiment, the reception quality figure may correspond to a signal comprising the entire or a large portion of the spectrum transmitted by the satellite, for at least the purpose of reducing the sensitivity of signal reception quality estimation to any one or more carriers that may or may not be present in the satellite's spectrum.

Once the initial position of the antenna (i.e. as reflected by the recorded motor state value) and the corresponding reception quality level may be recorded, controller 120 may be configured to drive the motor (e.g. motor 150) exactly one step from its previous position (i.e. the initial position), e.g. by commanding the motor with a state value which is one unit either higher or lower than its previous value. Controller 120 may be further configured to determine a starting direction in accordance to whether the new value commanded to the motor is higher or lower than the initial value.

For each new position of the antenna within the peaking scanning range, controller 120 may be configured to obtain multiple readings of the reception quality figure (e.g. as may be obtained from estimator 140) over a predefined interval. Once the interval expires, controller 120 may be configured to calculate an average value of the multiple reception quality readings for at least the purpose of reducing the effects of changes in the reception quality level which may be caused be reasons other than a change in the satellite's position (for example interferences, unsmooth motor motion, wind gusts, etc). Controller 120 may be then configured to store the average value and the corresponding antenna position (i.e. the corresponding motor state value), and to move the antenna to the next position along the determined starting direction, as previously described.

Controller 120 may be further configured to continue scanning along the starting direction one motor step at a time until the reception quality level drops below the reception quality level recorded for the starting position by at least a predefined tolerance. The motor may be driven exactly one step at a time for at least the purpose of minimizing any exceeding of the predefined tolerance. When the level has dropped by at least said tolerance, controller 120 may be configured to resume the initial (starting) position and continue scanning one motor step at a time as previously described but in the direction opposite to the starting direction. Once the reception quality level drops below the reception quality level recorded for the starting position by the at least the predefined tolerance, controller 120 may stop scanning in the direction opposite to the starting direction and start processing the data as recorded in the process described above.

Controller 120 may be configured to examine said stored reception quality readings and to identify among them two readings, one stored during scanning in the starting direction and one stored during scanning in the direction opposite to the starting direction, wherein the two readings are as low as possible compared to all other stored readings and (nearly) equal to one another. Controller 120 may be further configured to derive from said storing two antenna positions (i.e. the corresponding motor state values) corresponding to the said identified two (nearly) equal and lowest readings, and to calculate the antenna position (i.e. the corresponding motor state value) corresponding to aligning the center of the antenna beam with the satellite as the middle position between said derived two antenna positions. Once the antenna position corresponding to the center of the beam is calculated, controller 120 may be configured to drive the antenna motor (e.g. motor 150) in accordance with the calculated value.

In some embodiments of this invention, wherein this peaking method may be combined with the method for tracking an inclined orbit geostationary satellite as previously described and in particularly with said filtering of the tracking table, said tolerance may be set to a very low value (e.g. 0.25 dB) for at least the purpose of minimizing the degradation in signal reception level during peaking and consequently minimizing the effect on the ground station's performance. While low tolerance may increase the probability for alignment errors, the filter used afterwards for removing irregularities may eliminate these alignment errors. Thus, preserving the ground station's performance during peaking can be achieved at the cost of less accurate peaking.

In yet another aspect of the invention, controller 120 of ground station 100 may be configured to perform the peaking process in accordance with the method presented above and/or to track an inclined orbit geostationary satellite in accordance to the methods described above. Controller 120 may comprise at least a micro-controller, which may be configured to drive and/or control an antenna motor (e.g. actuator motor), and to receive from said antenna motor feedback pulses.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method for tracking an inclined orbit geostationary satellite at a ground station, the method comprising a learning step and a tracking step, the learning step comprising:
performing multiple instances of a peaking process for a satellite at constant predetermined intervals over a period of a full inclination cycle;
storing results of said peaking process instances, wherein said stored peaking results are motor state values corresponding to antenna positions and to satellite positions along an inclination path;
applying a filter to the stored peaking results for reducing alignment errors; and
replacing the stored peaking results with corresponding values resulting from said filter application.

2. The method of claim 1, wherein the predetermined intervals for performing the peaking process (t) are selected so that a natural number (N) of such intervals exactly fit into an inclination cycle duration (T) using the equation $T=N*t$.

3. The method of claim 1, wherein performing the peaking process comprises:
commanding a motor at the ground station to change position of a tracking antenna at the ground station over a moving axis of the tracking antenna, in order to find a position of the satellite along the inclination path;
commanding the motor to point the center of a beam of the tracking antenna at the satellite once the position of the satellite is determined; and
storing the peaking process result once the center of the tracking antenna beam is pointed at the satellite.

4. The method of claim 3, wherein storing the peaking process result once the center of the tracking antenna beam is pointed at the satellite comprises:
recording a value corresponding to a state of the motor and to a position of the tracking antenna;
receiving a signal from the satellite and recording a reception quality figure for the received signal; and
recording a time stamp corresponding to the time of recording said motor state and said reception quality figure.

5. The method of claim 1, wherein the tracking step comprises:
calculating a motor state value corresponding to a determined antenna position every predetermined interval;
commanding a motor at the ground station with the calculated motor state value in order to move an antenna at the ground station to the determined antenna position;
receiving a signal from the satellite and obtaining a first reception quality figure for the received signal once the antenna is in the determined position;

comparing said first obtained reception quality figure to a second previously stored reception quality figure corresponding to the determined antenna position; and performing the peaking process for a current satellite position if the difference between first obtained reception quality figure and the second previously stored reception quality figure exceeds a predefined threshold.

6. The method of claim 5, further comprising:

determining whether the difference between first obtained reception quality figure and the second previously stored reception quality figure exceeds a predefined threshold for a predefined number of consecutive comparisons; and repeating the learning step based on said determination.

7. The method of claim 5, further comprising:

determining whether the peaking process of the tracking step has not completed successfully for a predetermined number of consecutive attempts; and repeating the learning step based on said determination.

8. The method of claim 5, wherein the predetermined intervals for calculating the motor state value in the tracking step are the same as the constant predetermined intervals for performing the peaking process in the learning step.

9. The method of claim 1, wherein said peaking process comprises a process for aligning an antenna with a satellite, the peaking process comprising:

recording an initial motor state value for a motor at the ground station, the initial motor state value corresponding to an initial antenna position;

receiving a signal from the satellite and recording a reception quality figure for the received signal; and driving the antenna exactly one step from the initial antenna position by commanding the motor with a state value one unit either higher or lower than the initial motor state value;

determining whether the new value commanded to the motor is higher or lower than the initial motor state value; and based on said determination, determining a starting direction for said peaking process.

10. The method of claim 1, wherein said peaking process comprises a process for aligning an antenna with a satellite, the peaking process comprising:

recording an initial motor state value for a motor at the ground station and an initial reception quality figure of a signal received from the satellite, both corresponding to an initial antenna position;

driving the antenna to positions within a scanning range around the initial position, first to one direction and then to the opposite direction, wherein at each step in the same direction the antenna is driven exactly one step away from its previous position;

recording for each scanned position a calculated average value of multiple reception quality figures obtained in said position and a motor state value corresponding to said position;

determining that two recorded average reception quality values, one per scanned direction, are lower than the initial reception quality figure by at least a predefined tolerance;

identifying two recorded average reception quality values one per scanned direction, wherein said identified values are the lowest recorded average reception quality values with a difference between them which is lower than a predefined tolerance;

determining two motor state value corresponding to said identified reception quality values;

calculating a motor state value corresponding to an antenna position, which aligns the center of an antenna beam with the satellite, as a middle motor state value between said determined two motor state values; and commanding the motor with said calculated middle motor state value.

11. The method of claim 10, wherein one or more resulting alignment errors are thereafter removed by applying a filter on the peaking process results.

12. A ground station configured to communicate via an inclined orbit geostationary satellite, the ground station comprising:

a tracking antenna having three fixed axis and one moving axis;

a motor configured to swing the antenna along the moving axis;

a controller configured to control the motor;

a receiver configured to receive a signal from a satellite via the tracking antenna; and an estimator configured to estimate reception quality of a signal received by the receiver, wherein the controller is further configured to track the satellite by performing a learning step and a tracking step, said learning step comprising:

performing multiple instances of a peaking process for the satellite at constant predetermined intervals over a period of a full inclination cycle;

storing results of said peaking process instances, wherein said stored peaking results are motor state values corresponding to antenna positions and to satellite positions along an inclination path;

applying a filter to the stored peaking results for reducing alignment errors; and replacing the stored peaking results with corresponding values resulting from said filter application.

13. The ground station of claim 12, wherein the controller is configured to select the interval for performing the peaking process (t) so that a natural number (N) of such intervals exactly fit into an inclination cycle duration (T), using the equation T=N*t.

14. The ground station of claim 12, wherein for performing the peaking process the controller is configured to:

command the motor to change the position of the tracking antenna over the moving axis in order to find a position of the satellite along the inclination path;

command the motor to point the center of a beam of the tracking antenna at the satellite once the position of the satellite is determined; and store the peaking process result once the center of the tracking antenna beam is pointed at the satellite.

15. The ground station of claim 14, wherein once the center of the beam of the tracking antenna is pointed at the satellite, the controller is further configured to:

record a value corresponding to a state of the motor and to a position of the tracking antenna;

receive a signal from the satellite and record a reception quality figure from the estimator for the signal received from the satellite; and record a time stamp corresponding to the time of recording said motor state and said reception quality figure.

16. The ground station of claim 12, wherein the tracking step comprises:

calculating a motor state value corresponding to a determined antenna position every predetermined interval;

commanding the motor with the calculated state value in order to move the tracking antenna to the determined antenna position;

receiving a signal from the satellite and obtaining a first reception quality figure for the received signal once the tracking antenna is in the determined position;

comparing said first obtained reception quality figure to a second previously stored reception quality figure corresponding to the determined antenna position; and performing the peaking process for a current satellite position if the difference between first obtained reception quality figure and the second previously stored reception quality figure exceeds a predefined threshold.

17. The ground station of claim 16, wherein the controller is further configured to:

determine whether the difference between first obtained reception quality figure and the second previously stored reception quality figure exceeds a predefined threshold for a predefined number of consecutive comparisons; and repeat the learning step based on said determination.

18. The ground station of claim 16, wherein the controller is further configured to:

determine whether the peaking process of the tracking step has not completed successfully for a predetermined number of consecutive attempts; and repeat the learning step based on said determination.

19. The ground station of claim 16, wherein the controller is configured to select the predetermined interval for calculating the motor state value in the tracking step to be the same as the constant predetermined intervals for performing the peaking process in the learning step.

20. The ground station of claim 12, wherein said peaking process comprises a process for aligning an antenna with a satellite, the peaking process comprising:

recording an initial motor state value for a motor at the ground station, the initial motor state value corresponding to an initial antenna position;

receiving a signal from the satellite and recording a reception quality figure for the received signal; and driving the antenna exactly one step from the initial antenna position by commanding the motor with a state value one unit either higher or lower than the initial motor state value;

determining whether the new value commanded to the motor is higher or lower than the initial motor state value; and based on said determination, determining a starting direction for said peaking process.

21. The ground station of claim 12, wherein said peaking process comprises a process for aligning an antenna with a satellite, the peaking process comprising:

recording an initial motor state value for a motor at the ground station and an initial reception quality figure of a signal received from the satellite, both corresponding to an initial antenna position;

driving the antenna to positions within a scanning range around the initial position, first to one direction and then to the opposite direction, wherein at each step in the same direction the antenna is driven exactly one step away from its previous position;

recording for each scanned position a calculated average value of multiple reception quality figures obtained in said position and a motor state value corresponding to said position;

determining that two recorded average reception quality values, one per scanned direction, are lower than the initial reception quality figure by at least a predefined tolerance;

identifying two recorded average reception quality values one per scanned direction, wherein said identified values are the lowest recorded average reception quality values with a difference between them which is lower than a predefined tolerance;

determining two motor state value corresponding to said identified reception quality values;

calculating a motor state value corresponding to an antenna position, which aligns the center of an antenna beam with the satellite, as a middle motor state value between said determined two motor state values; and commanding the motor with said calculated middle motor state value.

22. The ground station of claim 21, wherein one or more resulting alignment errors are thereafter removed by applying a filter on the peaking process results.

23. A method for tracking an inclined orbit geostationary satellite at a ground station, the method comprising a peaking process for aligning an antenna with a satellite, the method comprising:

recording an initial motor state value for a motor at the ground station, the initial motor state value corresponding to an initial antenna position;

receiving a signal from the satellite and recording a reception quality figure for the received signal; and driving the antenna exactly one step from the initial antenna position by commanding the motor with a state value one unit either higher or lower than the initial motor state value;

determining whether the new value commanded to the motor is higher or lower than the initial motor state value; and based on said determination, determining a starting direction for said peaking process.

24. The method of claim 23, further comprising performing the following steps for a new antenna position within a peaking scanning range:

obtaining multiple reception quality figures over a predefined time interval;

calculating an average value of the obtained multiple reception quality figures after the predefined time interval expires;

recording the calculated average value of the obtained multiple reception quality figures and a corresponding motor state value;

determining whether the calculated average value of the obtained multiple reception quality figures is lower than an initial reception quality figure by at least a predefined tolerance; and driving the motor exactly one step from its current position in accordance with the starting direction if the calculated average value of the obtained multiple reception quality figures is not lower than said initial reception quality figure by at least the predefined tolerance.

25. The method of claim 24, further comprising:

determining whether the calculated average value of the obtained multiple reception quality figures is lower than the initial reception quality figure by at least the predefined tolerance;

if the calculated average value of the obtained multiple reception quality figures is lower than the initial reception quality figure by at least the predefined tolerance, driving the antenna to the initial antenna position by commanding the motor with the initial motor state value;

after driving the antenna to the initial antenna position, scanning a plurality of motor steps one at a time in a direction opposite to the starting direction;

recording a calculated average reception quality figure and a corresponding motor state value for each of the plurality of motor steps scanned;

determining after scanning each of the plurality of motor steps whether the calculated average reception quality figure is lower than said initial reception quality figure by at least the predefined tolerance; and terminating the scanning if the calculated average reception quality figure is lower than said initial reception quality figure by at least the predefined tolerance.

26. The method of claim 25, further comprising the following steps upon terminating the scanning process:

identifying within the calculated average reception quality figures a first reception quality figure recorded during scanning in the starting direction and a second reception quality figure recorded during scanning in the direction opposite to the starting direction, wherein said first and second reception quality figures are the lowest calculated average reception quality figures with a difference between them, which is lower than a predefined tolerance;

determining a first motor state value corresponding to said first reception quality figure;

determining a second motor state value corresponding to said second reception quality figure;

calculating a motor state value corresponding to an antenna position which aligns the center of an antenna beam with the satellite as a middle motor state value between said first and second motor state values; and commanding the motor with said calculated middle motor state value.

27. The method of claim 23, wherein one or more resulting alignment errors are thereafter removed by applying a filter on the peaking process results.

* * * * *